United States Patent
Talati et al.

(10) Patent No.: US 10,925,280 B2
(45) Date of Patent: Feb. 23, 2021

(54) SOLID AGROCHEMICAL COMPOSITIONS

(71) Applicant: UPL LIMITED, West Bengal (IN)

(72) Inventors: Paresh Vithaldas Talati, Mumbai (IN); Jaidev Rajnikant Shroff, Dubai (AE); Vikram Rajnikant Shroff, Dubai (AE); Ekanath Bhoge Satish, Mumbai (IN)

(73) Assignee: UPL LIMITED, West Bengal (IN)

( * ) Notice: Subject to any disclaimer, the term of this patent is extended or adjusted under 35 U.S.C. 154(b) by 57 days.

(21) Appl. No.: 15/752,513

(22) PCT Filed: Jul. 30, 2016

(86) PCT No.: PCT/IB2016/054597
§ 371 (c)(1),
(2) Date: Feb. 13, 2018

(87) PCT Pub. No.: WO2017/025851
PCT Pub. Date: Feb. 16, 2017

(65) Prior Publication Data
US 2018/0228147 A1   Aug. 16, 2018

(30) Foreign Application Priority Data

Aug. 13, 2015 (IN) .............. 884/KOL/2015

(51) Int. Cl.
| *A01N 25/30* | (2006.01) |
| *A01N 57/20* | (2006.01) |
| *A01N 25/12* | (2006.01) |

(52) U.S. Cl.
CPC ............ *A01N 25/30* (2013.01); *A01N 25/12* (2013.01); *A01N 57/20* (2013.01)

(58) Field of Classification Search
CPC ......... A01N 25/12; A01N 25/30; A01N 57/20
See application file for complete search history.

(56) References Cited

U.S. PATENT DOCUMENTS

| 5,665,674 | A  | * | 9/1997  | Anderson | A01N 43/80 504/144 |
| 6,248,695 | B1 |   | 6/2001  | Griffiths |  |
| 6,479,432 | B1 |   | 11/2002 | Sixl |  |
| 8,883,689 | B2 | * | 11/2014 | Wu | A01N 43/76 504/270 |
| 2010/0261606 | A1 | * | 10/2010 | Patel | A01N 47/36 504/103 |
| 2014/0249029 | A1 | * | 9/2014  | Mao | A01N 25/30 504/161 |

FOREIGN PATENT DOCUMENTS

| EP | 0 582 561       | 2/1994  |
| WO | WO 1991-008666  | 6/1991  |
| WO | WO 2013/044449  | 4/2013  |
| WO | WO 2013/186652  | 12/2013 |

OTHER PUBLICATIONS

Curran, W. S., McGlamery, M.D., Liebl, R. A. and Lingenfelter, D. D., "Adjuvants for Enhancing Herbicide Performance", Penn State Extension Service, Agronomy Facts 37, 1999, pp. 1-5. (Year: 1999).*
The International Search Report issued in PCT/182016/054597, dated Oct. 20, 2016.

* cited by examiner

*Primary Examiner* — Mina Haghighatian
*Assistant Examiner* — Nathan W Schlientz
(74) *Attorney, Agent, or Firm* — IP Pundit LLC

(57) ABSTRACT

The present invention provides storage stable non-hygroscopic granular compositions comprising agrochemical active ingredients and at least two surfactants selected from an amine, an alkoxylated fatty alcohol and an alkylated vegetable oils.

6 Claims, No Drawings

SOLID AGROCHEMICAL COMPOSITIONS

FIELD OF INVENTION

The present invention relates to solid agrochemical compositions. The present invention provides storage stable non-hygroscopic granular herbicidal compositions comprising agrochemical active ingredient and surfactants.

BACKGROUND OF THE INVENTION

Herbicides are pesticides useful for killing or controlling unwanted plants. Generally there are two kinds of herbicides-selective and non-selective. Selective herbicides kill certain target weeds while leaving the desired crop relatively unharmed while non-selective herbicides kill both the weeds and crops.

Profitable crop production depends on effective weed control. The weeds can reduce field crop yields by competing for water, sunlight and nutrients. In today's crop production systems, starting off with a good burn-down program is a must as it helps to achieve maximum initial crop growth and reduce weed interference during early stages of the crop cycle. Since the weed-crop competition is critical during the early stages of crop cycle, the weed interference at early stage has a direct impact on the yield of the crop.

An effective weed control can be achieved by usage of herbicides appropriately. The activity of herbicides can be enhanced in various ways to achieve the maximum benefit. Agrochemical adjuvants/surfactants are widely used to enhance the activity of an herbicide. Choosing the right adjuvants in optimum quantity is very critical for the overall performance of the herbicide formulation.

In addition to this, stability of active ingredient and user-friendliness are some other important parameters to be taken into account while choosing the surfactants and making the formulation.

Glufosinate is a non-selective foliage application type herbicide which kills or controls many species of weeds. In The Pesticide Manual 15$^{th}$ Edition, glufosinate has been described as being widely used in burn-down segments, and for control of a wide range of broad-leaved weeds and grasses and sedges in cereals, cotton, corn and soy, fruit orchards, vineyards, rubber and oil palm plantations, ornamental trees and bushes, non-crop land, and pre-emergence in vegetables.

Conventionally, glufosinate is used in salt form. The salts are usually formulated as aqueous based formulations. However such aqueous formulations are suffering from several drawbacks. Generally, aqueous formulations limit the content of active ingredient to lower concentrations. In aqueous solutions, solidification or sedimentation of formulation happens at lower temperatures, especially with high concentration of the active ingredient and surfactants. Hence storage of such aqueous based formulations under different climatic conditions remains a challenge. Moreover, the aqueous formulations suffer from the problems such as leakage of containers, requirement of proper measurement of the formulation for diluting and further use.

Solid compositions do not have the above disadvantages since they are stable, free flowing and easy to handle. They avoid problems associated with disposal of containers and toxicity of solvents.

However, for the effective use of granules, it is necessary for the granules to be thoroughly wetted when they are introduced into water for application. Moreover, in case of molecules which require larger amounts of wetting agents to obtain acceptable biological activity, it is difficult to prepare the formulation as granules. In some cases for example glufosinate ammonium and glyphosate isopropyl amine salt, it is often difficult to prepare solid formulations due to the hygroscopic nature of the active ingredients. In case the surfactants are liquids or low melting solids, their incorporation in solid formulations is difficult in terms of flowability and storage stability.

U.S. Pat. No. 4,168,963 discloses glufosinate (2-amino-4-[hydroxy(methyl)phosphinoyl]butyric acid), its salts, its isomers, and their derivatives, which possess a good and broad activity against weeds of many botanical families. The ammonium salt of the compound is commercially available.

U.S. Pat. No. 3,799,758 discloses glyphosate (N-(phosphonomethyl) glycine) and their salts such as glyphosate-ammonium, glyphosate-diammonium, glyphosate-dimethylammonium, glyphosate-potassium and glyphosate-isopropylamine salt and which are useful as herbicides.

Glufosinate and glyphosate salts are hygroscopic in nature. These salts absorb moisture on exposure to ambient condition and turn to liquid. The ammonium salts of glufosinate and isopropyl amine salt of glyphosate are hygroscopic at normal conditions and hence it is a general practice to prepare aqueous formulation for these active ingredients. Due to hygroscopic nature, preparing solid formulation products using the salts is difficult. For compositions comprising these hygroscopic salts, for practical purpose, great care has to be taken to protect these products from humidity. It may require specific packaging and specific conditions for storage for long period of time.

U.S. Pat. No. 5,410,075 discloses process for making non-hygroscopic salts of glufosinate and glyphosate but they involve additional use of solvents which are not environmental friendly. The patent discloses that the compositions comprising such salts often need additional special packaging requirements such as use of bag made of water soluble polymer.

U.S. Pat. No. 5,543,385 discloses water dispersible granules of glufosinate. The patent describes the technical difficulties of making granules when considerable amount of liquid wetting agents are required to be used. To overcome these difficulties the granules are prepared using solid wetting agents while adopting specific granulating techniques such as drying the liquid wetting agents and then using them in making the granules along with other ingredients. During such processes, there is a possibility of chemical changes happening to the various ingredients which can affect the activity of the active ingredient. Additionally such special techniques are expensive.

In addition while making formulations using salt of glufosinate ammonium it requires additional drying processes or addition of drying agents to the formulations.

However, inventors of the present invention found out that by following said technique, some of the final granulated products were sticky and were not suitable for storage or further applications. Although while using certain solid wetting agents granules were formed, they did not give the required biological activity.

U.S. Pat. No. 6,642,177 discloses that to be effective, glufosinate must be formulated with a high concentration of surfactants to get the required bio efficacy.

In agricultural practice, there is therefore a need for solid commercial forms, especially granular forms of active ingredients such as glufosinate and glyphosate which are non-hygroscopic, can be easily handled, storage stable and are bio-efficacious. Inventors of the present invention have surprisingly been able to prepare granular agrochemical compositions which meet the needs described above.

OBJECTS OF THE INVENTION

It is an object of the present invention to provide non-hygroscopic granular compositions comprising hygroscopic agrochemical active ingredients.

Another object of the present invention is to provide non-hygroscopic granular storage stable compositions comprising hygroscopic agrochemical active ingredients.

Another object of the present invention is to provide non-hygroscopic granular compositions comprising hygroscopic agrochemical active ingredients which have rain-fast properties.

It is another object of the present invention to provide non-hygroscopic granular compositions comprising hygroscopic agrochemical active ingredients which are effective against unwanted plants.

SUMMARY OF THE INVENTION

The present invention provides storage stable non-hygroscopic granular compositions comprising at least one electrolytic agrochemical active ingredient and at least two surfactants selected from an amine, an alkoxylated fatty alcohol and an alkylated vegetable oil.

The present invention further relates to a process for preparing storage stable non-hygroscopic granular compositions comprising at least one electrolytic agrochemical active ingredient and at least two surfactants selected from an amine, an an alkoxylated fatty alcohol and an alkylated vegetable oil.

The present invention provides a method of weed control comprising applying to the unwanted plants, storage stable non-hygroscopic granular compositions comprising at least one electrolytic agrochemical active ingredient and at least two surfactants selected from an amine, an alkoxylated fatty alcohol and an alkylated vegetable oil.

DETAILED DESCRIPTION

Surprisingly inventors of the present invention found out that storage stable non-hygroscopic granular compositions comprising active ingredients such as glufosinate and/or glyphosate salts can be prepared by combining the glufosinate and/or glyphosate salts with the combination of at least two surfactants selected from an amine, an alkoxylated fatty alcohol and alkylated vegetable oil.

The present invention thus relates to storage stable non-hygroscopic granular compositions comprising electrolytic active ingredients. More particularly the present invention relates to granular compositions comprising electrolytic active ingredients and at least two surfactants selected from an amine, an alkoxylated fatty alcohol and an alkylated vegetable oil.

Non-hygroscopic granular compositions according to the present invention mean that the granular composition according to the present invention when exposed at 30° C. to an environment containing 60% humidity, no considerable uptake of moisture takes place.

The granular composition according to the present invention when exposed at 30° C. to an environment containing 60% humidity the weight gain of composition by way of absorbing moisture is less than 1%.

The relative weight gain of the granular composition by way of absorbing moisture compared to active ingredient is less than 50%.

The granular compositions of the present invention are free flowing, not sticky and are storage stable. Storage stable granular compositions according to the present invention mean that the granular composition when stored at ambient temperature for more than a month, degradation of the active ingredient is less than 0.5%.

In an embodiment, the present invention provides granular compositions comprising an electrolytic active ingredient and at least two surfactants selected from an amine, an alkoxylated fatty alcohol and an alkylated vegetable oil In an embodiment, the present invention provides granular compositions comprising an electrolytic active ingredient, an amine and an an alkoxylated fatty alcohol.

In another embodiment, the present invention provides granular compositions comprising an electrolytic active ingredient, an alkoxylated fatty alcohol and an alkylated vegetable oil.

In yet another embodiment, the present invention provides granular compositions comprising an electrolytic active ingredient, an amine and an alkylated vegetable oil.

In an embodiment, the present invention provides granular compositions comprising an electrolytic active ingredient, an amine, an alkoxylated fatty alcohol and an alkylated vegetable oil.

In an embodiment, the electrolytic active ingredient is selected from herbicide, fungicide or an insecticide.

In a preferred embodiment the electrolytic active ingredient is an herbicide.

In an embodiment of the present invention the compositions comprise salts of 2-amino-4-[hydroxy(methyl)phosphinoyl]butyric acid (glufosinate), its isomers (mixture of isomers or derivatives thereof as the active ingredient. Glufosinate can be selected from racemic or single enantiomer glufosinate —P.

According to an embodiment of the present invention, the salts of glufosinate is selected from hydrochloride, monosodium salt, disodium salt, monopotassium salt, dipotassium salt, monocalcium salt, ammonium salt, —NH3(CH3)+ salt, —NH2(CH3)2+ salt, —NH(CH3)3+ salt, —NH(CH3)2(C2H4OH)+ and —NH2(CH3)(C2H4OH)+. The ammonium salt of glufosinate is the preferred salt.

According to another embodiment of the present invention, the compositions comprise from about 1% to about 95% by weight of glufosinate, preferably from about 5% to about 90% by weight of the composition.

In an embodiment of the present invention the compositions comprise salts of N-(phosphonomethyl) glycine (glyphosate) as the active ingredient selected from glyphosate-mono ammonium, glyphosate diammonium, glyphosate-isopropylammonium, glyphosate-potassium and glyphosate isopropyl amine salt.

According to an embodiment of the present invention the isopropyl amine salt of glyphosate is the preferred salt.

According to another embodiment of the present invention, the composition comprises from about 1% to about 95% by weight of glyphosate, preferably from about 5% to about 90% by weight of the composition.

In an embodiment, the amine can be selected from ethylene diamine, trimethylene diamine, tetramethylenediamine, diethylenetriamine, triethylenetetramine, triaminodiethylamine, N-hydroxyethylethylenediamine, hexamethylenediamine, hexadecylamine and hexamethylenetetramine. Preferably the amine is selected from hexamethylenediamine and hexamethylenetetramine.

In another embodiment of the present invention, the amine is present in an amount from about 0.1% to about 80% by weight, preferably from about 1 to about 70% by weight of the composition.

In an embodiment the alkyl group of the fatty alcohol that can be present in the compositions according to the present invention contains linear or branched alkyl groups having from about 5 to about 20 carbon atoms. The compositions contain a combination of fatty alcohols in which the alkyl groups are having from about 5 to about 20 carbon atoms. Preferably the fatty alcohol contains from about 9 to about 17 carbon atoms.

In an embodiment the alkoxylate represents an adduct of from about 3 to about 15 moles of ethylene oxide and/or propylene oxide to the alcohol preferably from about 5 to about 12 moles of alkoxylate. Preferably the alkoxylated fatty alcohol is selected from ethoxylated and propoxylated fatty alcohols.

In an embodiment of the present invention, the alkoxylated fatty alcohol is present in an amount from about 0.1 to about 30% by weight, preferably from about 1 to about 20% by weight of the composition.

In an embodiment of the present invention, the alkylated vegetable oil according to the present invention comprises mono alkyl esters of long chain fatty acids. The esters of fatty acids comprise one or more acids selected from saturated or unsaturated acids containing from about 10 to about 24 carbon atoms. Suitable esters of fatty acids are those with linear or branched mono or polyhydric alcohols having from about 1 to about 8 carbon atoms.

In an embodiment of the present invention the compositions comprise one or more mono alkyl esters of fatty acids selected from the group consisting of wheat germ methyl ester, wheat germ ethyl ester, wheat germ propyl ester, corn oil methyl ester, soybean oil methyl ester, soybean oil ethyl ester, soybean oil propyl ester, coconut oil methyl ester, coconut oil ethyl ester, coconut oil propyl ester, cotton seed oil methyl ester, cotton seed oil ethyl ester, cotton seed oil propyl ester, corn oil ethyl ester, corn oil propyl ester, sunflower oil methyl ester, sunflower oil ethyl ester, sunflower oil propyl ester, safflower oil methyl ester, safflower oil ethyl ester, safflower oil propyl ester, rapeseed oil methyl ester, rapeseed oil ethyl ester, rapeseed oil propyl ester, mustard oil methyl ester, mustard oil ethyl ester, mustard oil propyl ester, castor oil methyl ester, castor oil ethyl ester, castor oil propyl ester, sesame oil methyl ester, sesame oil ethyl ester, sesame oil propyl ester, pine oil methyl ester, pine oil ethyl ester, pine oil propyl ester, linseed oil methyl ester, linseed oil ethyl ester, linseed oil propyl ester, jatropha methyl ester, jatropha ethyl ester, jatropha propyl ester, algae methyl ester, algae ethyl ester, algae propyl ester, tallow methyl ester, tallow ethyl ester, tallow propyl ester, methyl palmitate, ethyl palmitate, propyl palmitate, methyl stearate, ethyl stearate, propyl stearate, methyl oleate, ethyl oleate, propyl oleate, methyl linoleate, ethyl linoleate, and propyl linoleate.

In another embodiment of the present invention, the alkylated vegetable oil is present in an amount from about 0.1 to about 30% by weight, preferably from about 1 to about 20% by weight of the composition.

In an embodiment, the alkylated vegetable oil is a methylated vegetable oil.

In a preferred embodiment, the methylated vegetable oil is selected from methylated corn oil, methylated linseed oil, methylated soybean oil, methylated rapeseed oil, methylated cotton seed oil and methylated sunflower oil.

In an embodiment at least two surfactants are incorporated into the granular compositions of the present invention.

In an embodiment of the present invention the composition comprises from about 0.1% to about 80% by weight of at least two surfactants selected from an amine, an alkoxylated fatty alcohol and an alkylated vegetable oil.

According to an embodiment of the present invention, the granular compositions comprise a combination of electrolytic active ingredients and other active ingredients selected from various classes of pesticides including fungicides, insecticides and herbicides, preferably with herbicides and mixtures thereof.

According to another embodiment of the present invention, the granular compositions comprise glufosinate and/or glyphosate and other active ingredients selected from various classes of pesticides, preferably from herbicides and mixtures thereof.

According to another embodiment of the present invention, the active ingredient that can be present along with glufosinate salts and/or glyphosate salts according to the granular compositions are selected from herbicides such as allidochlor, amicarbazone, beflubutamid, benzadox, benzipram, bromobutide, cafenstrole, cyprazole, dimethenamid, dimethenamid-P, diphenamid, epronaz, etnipromid, fentrazamide, flucarbazone, flupoxam, fomesafen, halosafen, huangcaoling, isocarbamid, isoxaben, napropamide, napropamide-M naptalam, pethoxamid, propyzamide, quinonamid, saflufenacil, tebutam, tiafenacil, sulfonamide herbicide such as asulam, carbasulam, fenasulam, oryzalin, penoxsulam, pyroxsulam, aryloxycarboxylic acids such as MCPA-thioethyl, aryloxyphenoxypropionates such as clodinafop-propargyl, cyhalofop-butyl, diclofops, fluazifops, haloxyfops and its esters, haloxyfop-P and its esters, quizalofops, chloroacetamides such as acetolochlor, alachlor, butachlor, dimethenamid, metolachlor, propachlor, cyclohexanedione oximes such as alloxydim, butroxydim, clethodim, cloproxydim, cycloxydim, profoxydim, sethoxydim, tepraloxydim, tralkoxydim, benzamides such as isoxaben, benzoic acid derivatives such as dicamba, ethofumesate, dinitroanilines such as benfluralin, butralin, chlornidine, dinitramine, dipropalin, ethalfluralin, fluchloralin, isopropalin methalpropalin, nitralin, oryzalin, pendimethalin, prodiamine, profluralin, trifluralin, diphenyl ethers such as acifluorfen, aclonifen, bifenox, chlomethoxyfen, chlornitrofen, etnipromid, fluorodifen, fluoroglycofen, fluoronitrofen, fomesafen, fucaomi, furyloxyfen, halosafen, lactofen, nitrofen, nitrofluorfen, oxyfluorfen, organophosphorus herbicides such as glufosinate and glyphosate, hydroxybenzonitriles such as bromoxynil, imidazolinones such as fenamidone, imazapic, imazamox, imazapic, imazapyr, imazethapyr, imazaquin, isoxazolidinones such as clomazone paraquat as bypyridylium, phenyl carbamates such as desmedipham, phenmedipham, phenylpyrazoles such as pyraflufen-ethyl, phenylpyrazolines such as pinoxaden, pyridinecarboxylic acids or synthetic auxins such as picloram, clopyralid, and triclopyr, pyrimidinyloxybenzoics such as bispyrtbac-sodium, sulfonylureas such as amidosulfuron, azimsulfuron, bensulfuron-methyl, chlorsulfuron, chlorimuron, cyclosulfamuron, ethoxysulfuron, flazasulfuron, flucetosulfuron, flupyrsulfuron, foramsulfuron, halosulfuron, imazosulfuron, mesosulfuron, metsulfuron-methyl, methiopyrisulfuron, monosulfuron, nicosulfuron, orthosulfamuron, oxasulfuron, primisulfuron, propyrisulfuron, pyrazosulfuron, rimsulfuron, sulfometuron, sulfosulfuron trifloxysulfuron, flazasulfuron, foramsulfuron, flupyrsulfuron-methyl-sodium, nicosulfuron, rimsulfuron, sulfosulfuron, tribenuron-methyl, trifloxysurlfuron-sodium, triflusulfuron, tritosulfuron, triazolopyrimidines such as penoxsulam, metosulam, florasulam, triketones such as mesotriones, sulcotrione, ureas such as diuron, linuron, phenoxycarboxylic acids such as 2,4-D, MCPA, MCPB, mecoprops and triazines such as atrazine, simazine and terbuthylazine or mixtures of such herbicides.

In an embodiment of the present invention there is provided a granular composition comprising glufosinate ammonium, an amine and ethoxylated fatty alcohol. Accordingly the composition comprises from about 20% to about 70% by weight of glufosinate ammonium, from about 5% to about 30% by weight of amine and from about 5% to about 20% by weight of ethoxylated fatty alcohol.

In another embodiment of the present invention there is provided a granular composition comprising glufosinate ammonium, an amine and methylated vegetable oil. Accordingly the composition comprises from about 20% to about 70% by weight of glufosinate ammonium, from about 5% to about 30% by weight of amine and from about 5% to about 30% by weight of methylated vegetable oil.

In another embodiment of the present invention there is provided a granular composition comprising glufosinate ammonium, ethoxylated fatty alcohol and methylated vegetable oil. Accordingly the composition comprises from about 20% to about 70% by weight of glufosinate ammonium, from about 5% to about 20% by weight of ethoxylated fatty alcohol and from about 5% to about 30% by weight of methylated vegetable oil.

In an embodiment of the present invention there is provided a granular composition comprising glufosinate ammonium, flumioxazin, and at least two surfactants selected from an amine, an alkoxylated fatty alcohol and an alkylated vegetable oil. Accordingly the composition comprises from about 20% to about 60% by weight of glufosinate ammonium, from about 1% to about 40% by weight of flumioxazin, from about 0.1% to about 20% by weight of amine, from about 0.1% to about 20% by weight of ethoxylated fatty alcohol and from about 0.1% to about 20% by weight of methylated vegetable oil.

In another embodiment of the present invention there is provided a granular composition comprising glyphosate isopropylamine, ethoxylated fatty alcohol and methylated vegetable oil. Accordingly the composition comprises from about 20% to about 70% by weight of glyphosate isopropylamine, from about 5% to about 20% by weight of ethoxylated fatty alcohol and from about 5% to about 30% by weight of methylated vegetable oil.

In yet another embodiment of the present invention there is provided a granular composition comprising glufosinate ammonium, glyphosate isopropyl amine, ethoxylated fatty alcohol and an amine. Accordingly the composition comprises from about 10% to about 60% by weight of glufosinate ammonium, from about 10% to about 50% by weight of glyphosate isopropylamine, from about 0.1% to about 30% by weight of ethoxylated fatty alcohol and from about 0.1% to about 30% by weight of amine.

In a preferred embodiment, the present invention provides a granular composition comprising glufosinate ammonium, ethoxylated $C_{12}$-$C_{15}$ alcohol and methylated soybean oil.

In an embodiment, the present invention provides a granular composition comprising glufosinate ammonium, methylated cotton seed oil and hexamethylene tetramine.

In an embodiment, the present invention provides a granular composition comprising glufosinate ammonium, ethoxylated $C_{12}$-$C_{15}$ alcohol, hexamethylene tetramine and methylated soybean oil.

In an embodiment, the present invention provides a granular composition comprising glufosinate ammonium, ethoxylated $C_{12}$-$C_{15}$ alcohol, methylated cotton seed oil and hexamethylene tetramine.

In an embodiment, the present invention provides a granular composition comprising glufosinate ammonium, ethoxylated $C_{12}$-$C_{14}$ alcohol, methylated linseed oil and hexadecylamine.

In an embodiment, the present invention provides a granular composition comprising glyphosate isopropyl amine salt, ethoxylated $C_{12}$-$C_{14}$ alcohol, methylated linseed oil and hexamethylene tetramine.

In another embodiment, the present invention provides a granular composition comprising glufosinate ammonium, glyphosate isopropylamine, ethoxylated branched $C_{12}$-$C_{15}$ alcohol and hexamethylene tetramine.

In another embodiment, the present invention provides a granular composition comprising glufosinate ammonium, flumioxazin, ethoxylated $C_{12}$-$C_{15}$ alcohol and hexamethylene tetramine.

The herbicidal composition of the invention may further comprise other agronomically suitable excipients such as auxiliary adjuvants/surfactants such as wetting agents spreading agents, penetration aids, dispersing agents, carriers, fertilizer such as urea and ammonium sulfate, sticking and binding agents such as sugar, lignin and their derivatives, polyvinyl pyrrolidone, starch, natural gum such as xanthan gum, guar gum, carboxy methyl cellulose and their derivatives, inert ingredients, pH modifiers, suspending agents, spray droplet modifiers, pigments, antioxidants, UV protectants, compatibilizing agents, antifoam agents, sequestering agents, neutralizing agents, corrosion inhibitors, dyes, odorants, micronutrients, emollients, lubricants, and the like.

In an embodiment of the present invention, the surfactants may be selected from anionic, cationic or zwitterionic and/or nonionic surface active compounds (surfactants).

Examples of anionic surfactants include: anionic derivatives of fatty alcohols having 10-24 carbon atoms in the form of ether carboxylates, sulfonates, sulfates, and phosphates, and their inorganic salts (e.g., alkali metal and alkaline earth metal salts) and organic salts (e.g., salts based on amine or alkanolamine); anionic derivatives of copolymers consisting of EO (ethylene oxide), PO (propylene oxide) and/or BO (butylene oxide) units, in the form of ether carboxylates, sulfonates, sulfates, and phosphates, and their inorganic salts (e.g., alkali metal and alkaline earth metal salts) and organic salts (e.g., salts based on amine or alkanolamine); derivatives of alkylene oxide adducts of alcohols, in the form of ether carboxylates, sulfonates, sulfates and phosphates, and their inorganic salts (e.g., alkali metal and alkaline earth metal salts) and organic salts (e.g., salts based on amine or alkanolamine); derivatives of fatty acid alkoxylates, in the form of ether carboxylates, sulfonates, sulfates and phosphates, and their inorganic salts (e.g., alkali metal and alkaline earth metal salts) and organic salts (e.g., salts based on amine or alkanolamine).

Examples of cationic or zwitterionic surfactants may be selected from alkylene oxide adducts of fatty amines, quaternary ammonium compounds having 8 to 22 carbon atoms (C8-C22), surface-active zwitterionic compounds such as taurides, betaines and sulfobetaines.

Examples of nonionic surfactants which may be used are: fatty alcohols having 10-24 carbon atoms with 0-60 EO and/or 0-20 PO and/or 0-15 BO in any order; fatty acid alkoxylates and triglyceride alkoxylates; fatty acid amide alkoxylates; alkylene oxide adducts of alkynediols; sugar derivatives such as amino sugars and amido sugars, alkyl polyglycosides; polyacrylic and polymethacrylic derivatives; polyamides such as modified gelatins or derivatized polyaspartic acid; polyvinyl compounds such as modified PVP; polyol-based alkylene oxide adducts; polyglycerides and derivatives thereof.

The compositions according to the present invention can contain single active ingredient or more than one active ingredients. The composition can be prepared as pre-mix, or by tank-mixing with other actives or alternatively may be sold as a kit of parts containing actives and other ingredients that may be mixed prior to spraying or a ready mix kit of parts containing premixed ingredients and actives described above.

In an embodiment of the present invention, there is provided a process for the preparation of granular compositions according to the present invention said process comprising:
  i) mixing the active ingredient with at least two surfactants selected from an amine, an alkoxylated fatty alcohol and an alkylated vegetable oil in a mixture;
  ii) adding additional customary excipients if required;
  iii) grinding and pulverizing if required; and
  iv) granulating said mixture to obtain storage stable non hygroscopic granular compositions.

In another embodiment of the present invention the process of adding the ingredients can be in any order.

In yet another embodiment of the present invention the step of granulating the mixture is not particularly limiting. Appropriate granulating processes are all conventional processes described in granulating technology for example spray drying, fluidized bed granulation, agglomeration, pan granulation and extrusion granulation.

In another embodiment of the present invention the size of the granules ranges from about 0.1 mm to about 2 mm preferably from about 0.5 to about 1.5 mm.

In an embodiment of the present invention there is provided a method to control unwanted plants or to influence the growth of plants by treating said plants in the field with an effective amount of the granular herbicidal compositions according to the present invention.

In a preferred embodiment of the present invention, there is provided a method to control harmful plants, said method comprising applying to the plants or to their locus an effective amount of the granular composition comprising glufosinate and at least two surfactants selected from the group consisting of an amine an an alkoxylated fatty alcohol and an alkylated vegetable oil.

Inventors of the present invention succeeded in inventing storage stable non-hygroscopic granular compositions by the careful combination of at least one electrolytic active ingredient and at least two surfactants selected from an amine, an alkoxylated fatty alcohol and alkylated vegetable oil. The invention is illustrated by the experiments as exemplified below.

EXAMPLES

Example 1

A composition of glufosinate ammonium (60 WG) according to the present invention was prepared as follows:

| Ingredients | % (w/w) |
| --- | --- |
| Glufosinate Ammonium | 60 |
| $C_{12}$-$C_{15}$ alcohol + 7EO (Ethoxylated fatty alcohol) | 9 |
| Methylated soybean oil | 15 |
| Starch | 16 |
| Total | 100.00 |

General Process for Making the Composition:

Glufosinate ammonium was mixed with required quantity of ethoxylated $C_{12}$-$C_{15}$ alcohol and soybean oil methyl ester in a mixture. Further customary adjuvants, along with starch added. Sufficient quantity of water was added to make dough of the composition. Further the dough was granulated using extrusion granulating process to prepare granules having a size from about 0.5 to about 1.5 mm.

Example 2

A composition of glufosinate ammonium (60 WG) according to the present invention was prepared as follows:

| Ingredients | % (w/w) |
| --- | --- |
| Glufosinate Ammonium | 60 |
| Methylated cotton seed oil | 17 |
| Hexamethylene tetramine | 15 |
| Urea | 8 |
| Total | 100.00 |

Example 3

A composition of glufosinate ammonium (50 WG) according to the present invention was prepared as follows:

| Ingredients | % (w/w) |
| --- | --- |
| Glufosinate Ammonium | 50 |
| $C_{12}$-$C_{15}$ alcohol + 9 EO | 10 |
| Hexamethylene tetramine | 10 |
| Starch | 30 |
| Total | 100.00 |

Example 4

A composition of glufosinate ammonium (50 WG) according to the present invention was prepared as follows:

| Ingredients | % (w/w) |
| --- | --- |
| Glufosinate Ammonium | 50 |
| $C_{12}$-$C_{15}$ alcohol + 7EO | 15 |
| Hexamethylene tetramine | 20 |
| Methylated soybean oil | 9 |
| Polyvinyl pyrrolidone | 6 |
| Total | 100.00 |

Example 5

A composition of glufosinate ammonium (50 WG) according to the present invention was prepared as follows:

| Ingredients | % (w/w) |
| --- | --- |
| Glufosinate Ammonium | 50 |
| $C_{12}$-$C_{14}$ Alcohol + 11 EO | 10 |
| Methylated soybean oil | 10 |
| Hexamethylene tetramine | 18 |
| Urea | 12 |
| Total | 100.00 |

Example 6

A composition of glufosinate ammonium (50 WG) according to the present invention was prepared as follows:

| Ingredients | % (w/w) |
| --- | --- |
| Glufosinate Ammonium | 50 |
| Branched $C_{12}$-$C_{15}$ Alcohol + 6EO | 16 |
| Methylated linseed oil | 8 |
| Hexadecyl amine | 12 |
| Urea | 14 |
| Total | 100.00 |

Example 7

A composition of glufosinate ammonium and glyphosate isopropyl amine according to the present invention was prepared as follows:

| Ingredients | % (w/w) |
| --- | --- |
| Glufosinate Ammonium | 45 |
| Glyphosate isopropyl amine | 5 |
| $C_{12}$-$C_{15}$ alcohol + 9 EO | 4 |
| Hexadecyl amine | 2 |
| Ammonium sulfate | 44 |
| Total | 100.00 |

Example 8

A composition of glufosinate ammonium and flumioxazin according the present invention was prepared as follows:

| Ingredients | % (w/w) |
| --- | --- |
| Glufosinate Ammonium | 40 |
| Flumioxazin | 10 |
| $C_{12}$-$C_{15}$ alcohol + 9 EO | 1 |
| Hexamethylene tetramine | 5 |
| Polyvinyl pyrrolidone | 10 |
| Starch | 34 |
| Total | 100.00 |

Example 9

A composition of Glyphosate isopropyl amine salt (45 WG) according to the present invention was prepared as follows:

| Ingredients | % (w/w) |
| --- | --- |
| Glyphosate isopropyl amine salt | 45 |
| $C_{12}$-$C_{15}$ alcohol + 9EO | 17 |
| Hexamethylene tetramine | 20 |
| Methylated linseed oil | 11 |
| Polyvinyl pyrrolidone | 7 |
| Total | 100.00 |

Example 10: Comparative Example 1

A composition of glufosinate ammonium (WG) according to U.S. Pat. No. 5,543,385 using solid wetting agent was prepared as follows:

| Ingredients | % (w/w) |
| --- | --- |
| Glufosinate Ammonium | 26.5 |
| Hostapur | 67.5 |
| Polyvinyl pyrrolidone | 4 |
| Defoamer | 2 |
| Total | 100.00 |

Example 11: Comparative Example 2

A composition of glufosinate ammonium (WG) according to U.S. Pat. No. 5,543,385 using liquid wetting agent was prepared as follows:

| Ingredients | % (w/w) |
| --- | --- |
| Glufosinate Ammonium | 26.5 |
| Genapol | 30 |
| Kaoline | 23.5 |
| Calcium acetate | 10 |
| precipitated silica | 10 |
| Total | 100.00 |

Example 12

A composition of glufosinate ammonium (50 WG) prepared using alkoxylated fatty alcohol of the present invention:

| Ingredients | % (w/w) |
| --- | --- |
| Glufosinate Ammonium | 50 |
| Branched $C_{12}$-$C_{15}$ Alcohol + 6EO | 16 |
| Kaolin | 20 |
| Urea | 14 |
| Total | 100.00 |

Example 13

A composition of Glyphosate isopropyl amine (45 WG) prepared using amine of the present invention:

| Ingredients | % (w/w) |
| --- | --- |
| Glyphosate isopropyl amine salt | 45 |
| Kaolin | 20 |
| Hexamethylene tetramine | 18 |
| Hostapur | 10 |
| Polyvinyl pyrrolidone | 7 |
| Total | 100.00 |

Example 14

A composition of glufosinate ammonium (50 WG) prepared using alkylated vegetable oil of the present invention:

| Ingredients | % (w/w) |
| --- | --- |
| Glufosinate Ammonium | 50 |
| Methylated linseed oil | 20 |
| Kaolin | 14 |
| Urea | 16 |
| Total | 100.00 |

Storage Stability of the Compositions:

The granular compositions prepared according to the present invention were investigated for degradation of active ingredient. The samples were analyzed for stability by keeping the sample at 54±2° C. for 14 days (AHS as per CIPAC MT 46.3) and the results are summarized in Table 1.

TABLE 1

| Compositions | % active ingredient At 0 day | % active ingredient At 14 day AHS | % active ingredient Real time (after 6 months) |
| --- | --- | --- | --- |
| Example 1 | 50.23 | 50.18 | 50.11 |
| Example 2 | 50.44 | 50.41 | 50.39 |
| Example 3 | 50.39 | 50.37 | 50.28 |
| Example 4 | 50.56 | 50.53 | 50.46 |
| Example 12 | 50.38 | 47.89 | 46.09 |
| Example 13 | 45.12 | 43.29 | 42.12 |
| Example 14 | 50.51 | 47.71 | 46.88 |

It has been noted that the compositions according to the present invention are stable. The degradation of active ingredient after 6 months was found to be less than 0.5%. Examples 1-4 prepared according to the invention resulted in stable formulations. Examples 12-14 prepared using only one of the three surfactants selected from an amine, an alkoxylated fatty alcohol and alkylated vegetable oil were found to be leading to degradation of the active ingredient. It is further observed that for stable granular compositions suitable for long term storage can be prepared using at least two surfactants selected from an amine, an alkoxylated fatty alcohol and alkylated vegetable oil.

Physical Appearance and Uptake of Moisture:

The appearances for the granular compositions prepared according to the present invention were investigated in open containers at ambient conditions. The results are given in Table 2.

TABLE 2

| Composition | Appearance at 0 hrs | Appearance After 24 hrs | Appearance After 72 hrs |
| --- | --- | --- | --- |
| Glufosinate ammonium* | Dry solid | Wet solid | Liquid |
| Example 1 | Dry solid | Dry solid | Solid |
| Example 4 | Dry solid | Dry solid | Solid |
| Example 10 | Dry solid | Dry solid | Solid |
| Example 11 | Paste | Wet Paste | Liquid |
| Example 12 | Dry solid | Dry solid | Wet paste |

*technical

It has been observed that the granular compositions according to the present inventions are dry solids as evidenced by the appearance. The granular compositions were observed to be non-hygroscopic under ambient conditions. Further, the granules were appeared as dry solids after 6 months of storage. The inventors of the present invention confirmed the stability of the granules by investigating the weight gain of the compositions and by calculating the relative weight gain with respect to glufosinate salt. The weight gain of the granular compositions according to the present invention were investigated at 30° C. and 60% humidity as per ASTM (1996) method and the results are summarized in the below table (Table 3). Example 11 prepared as per U.S. Pat. No. 5,543,385 using a liquid wetting agent initially appeared as a paste and hence was not suitable for storage or further use for testing the bioefficacy. Example 12 prepared using alkoxylated fatty alcohol of the present invention lead to a wet paste after 72 hrs and hence was not suitable for storage.

TABLE 3

| Compositions | Weight of sample (g) | Weight of sample after 24 hrs (g) | % weight gain after 24 hrs | Relative % weight gain after 24 hrs |
| --- | --- | --- | --- | --- |
| Glufosinate ammonium* | 1.0035 | 1.0219 | 1.834 | 100 |
| Example 1 | 3.0135 | 3.0399 | 0.876 | 47.76 |
| Example 2 | 3.1666 | 3.1897 | 0.7294 | 39.77 |
| Example 3 | 3.0099 | 3.0322 | 0.7415 | 40.43 |
| Example 4 | 3.0979 | 3.1235 | 0.826 | 45.04 |
| Example 10 | 3.0400 | 3.0702 | 0.9940 | 54.19 |

*technical

Relative % weight gain of the composition is calculated using the formula given below:

$$\% \text{ weight gain} = \frac{\text{weight gain after 24 hrs} \times 100}{\text{weight of the sample}}$$

$$\text{Relative \% weight gain} = \frac{\% \text{ weight gain of composition} \times 100}{\% \text{ weight gain of } X}$$

wherein X is glufosinate ammonium technical

It has been observed that the granular compositions according to the present invention are non-hygroscopic. Under the given conditions, the uptake of moisture for compositions of the present invention (Example 1-4 of Table 3) was found to be considerably less compared to the samples prepared as per literature. In Examples 1-4 of the present invention, the relative weight gain was found to be less than 50% as compared to the weight gain of glufosinate ammonium. Thus the present invention provides stable and non-hygroscopic granular compositions of glufosinate salt.

Example 11 prepared as per U.S. Pat. No. 5,543,385 using a solid wetting agent was found to be non-hygroscopic as well, but gave poor bioefficacy. Inventors of the present invention successfully employed surfactants selected from an amine, an alkoxylated fatty alcohol and an alkylated vegetable oil for making the granular compositions of glufosinate which exhibit acceptable bioefficacy.

Field Trial:

Field trial was carried out using the compositions of glufosinate ammonium prepared according to the present invention as the broad spectrum herbicide. The compositions were diluted with water and optionally mixed with other tank mix auxiliaries and applied at a water application rate of 300-500l/ha to crop and non-crop land containing many broad leaves weeds, grasses and sedges. At a dose of 908.6 g/ha after treatment using compositions of glufosinate ammonium prepared according to the present invention, chlorosis followed by necrosis of the weeds was observed after 7 days demonstrating the bio-efficacy of the new compositions. The observations at 7 days after application are summarized in below Table 4.

The efficacy of the granular compositions prepared as per Example 4 and 5 was compared with an aqueous sample prepared as per example 11 of US 2005/0266999 (Aq. sample), and with a granular sample prepared as per U.S. Pat. No. 5,543,385 using a solid wetting agent (Example 11).

TABLE 4

| Composition | 7 DAT Percent Weed Control @ 908.6 gm a.i./ha | |
| --- | --- | --- |
| | Portulaca | Parthenium |
| Example 4 | 60.0 | 73.3 |
| Example 5 | 56.7 | 70.7 |
| Example 11 | 30.5 | 25.7 |
| Aq. sample | 46.7 | 53.3 |

It has been noted that the compositions according to the present invention are bio efficacious. It has been observed that compositions (as per Example 4 and 5) prepared according to the present invention led to better activity compared to Example 11 using a solid wetting agent and an aqueous sample prepared as per example 11 of US 2005/0266999.

Since the burn-down of the weeds is one of the most important steps to achieve maximum initial crop growth and minimize weed interference during early stages of the crop cycle, the compositions according to the present inventions are very advantageous.

The instant invention is more specifically explained by above examples. However, it should be understood that the scope of the present invention is not limited by the examples in any manner. It will be appreciated by any person skilled in the art that the present invention includes aforesaid examples and further can be modified and altered within the technical scope of the present invention.

The invention claimed is:

1. A non-hygroscopic granular composition comprising:
   (a) an active ingredient in an amount of about 20% to about 70% by weight of the composition, wherein the active ingredient is glufosinate or a salt thereof; and
   (b) at least two surfactants, selected from the group consisting of an amine, an alkoxylated fatty alcohol and an alkylated vegetable oil;
   wherein said amine is present in an amount of about 0.1% to about 30% by weight of the composition, and is selected from the group consisting of ethylene diamine, trimethylene diamine, tetramethylenediamine, diethylenetriamine, triethylenetetramine, N-hydroxyethylethylenediamine, hexamethylenediamine, hexadecylamine and hexamethylenetetramine;
   wherein said alkoxylated fatty alcohol is present in an amount of about 0.1% to about 20% by weight of the composition, and comprises a fatty alcohol comprising alkyl groups having about 5 to about 20 carbon atoms, and an alkoxylate comprising from about 3 moles to about 15 moles of ethylene oxide and/or propylene oxide;
   wherein said alkylated vegetable oil is present in an amount of about 1% to about 20% by weight of the composition, and is selected from the group consisting of methylated corn oil, methylated linseed oil, methylated soybean oil, methylated rapeseed oil, methylated cotton seed oil and methylated sunflower oil; and
   wherein the at least two surfactants are selected from the group consisting of an amine and an alkoxylated fatty alcohol, an amine and an alkylated vegetable oil, an alkoxylated fatty alcohol and an alkylated vegetable oil, and an amine, an alkoxylated fatty alcohol and an alkylated vegetable oil.

2. The non-hygroscopic granular composition according to claim 1, wherein the active ingredient is glufosinate ammonium salt.

3. The non-hygroscopic granular composition according to claim 1, wherein said amine is hexamethylenetetramine.

4. The non-hygroscopic granular composition according to claim 1, further comprising one or more active ingredients selected from the group consisting of fungicides, insecticides and herbicides.

5. A process for preparing the non-hygroscopic granular composition according to claim 1, wherein the process comprises:
   (a) mixing said glufosinate or a salt thereof with the at least two surfactants;
   (b) adding additional customary excipients if required;
   (c) grinding and pulverizing if required; and
   (d) granulating said mixture to obtain composition according to claim 1.

6. A method for controlling a weed, comprising applying to a locus of at least one of the weed an effective amount of the non-hygroscopic granular composition according to claim 1.

* * * * *